June 13, 1961
W. F. NEWBOLD
2,988,702
ELECTRONIC MEMORY AMPLIFIER
Filed Dec. 24, 1959
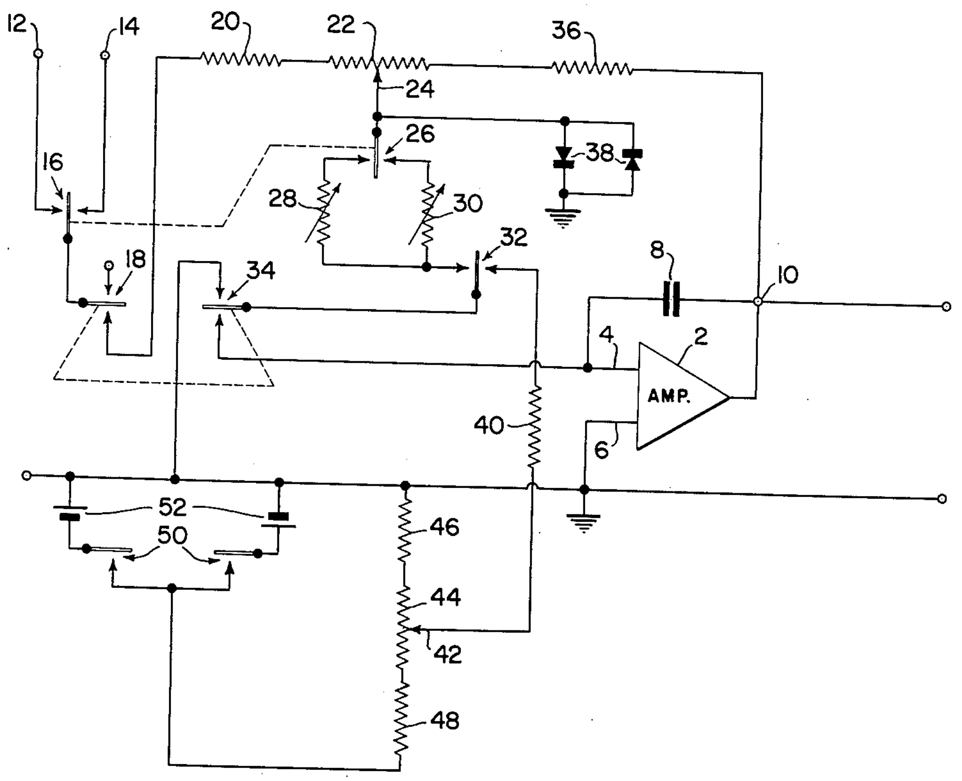
INVENTOR.
WILLIAM F. NEWBOLD
BY Arthur H. Swanson
ATTORNEY.

2,988,702
ELECTRONIC MEMORY AMPLIFIER

William F. Newbold, Springfield Township, Montgomery County, Pa., assignor to Minneapolis-Honeywell Regulator Company, Minneapolis, Minn., a corporation of Delaware Filed Dec. 24, 1959, Ser. No. 861,790
7 Claims. (Cl. 328—142)

This invention relates to electronic apparatus, and more particularly to electronic control systems.

For certain uses in the industrial control field, there has been a need for a servo type system to effect a desired control function. Such functions have been accomplished by the use of self-balancing potentiometric devices having auxiliary slidewires or the like for producing the desired output control signal. Those systems, of course, involve relatively costly mechanisms including balancing motors, slidewires and the like. It has become increasingly important in current practice to be able to accomplish the desired control functions without the use of mechanical or electromechanical movements.

Accordingly, it is an object of the present invention to provide an improved electrical control apparatus which is free from mechanically movable members.

One aspect of the control function provided by the servomechanisms hereinbefore mentioned is that the output signal follows a relatively straight line increase until the output signal approaches the value necessary to offset the input signal. As this value is approached, the straight line increase rounds off exponentially to a substantially constant value. The straight line increase of the output, as against time, is determined by the maximum velocity of the balancing motor. As the signal approaches the control point, the velocity of the motor decreases exponentially with a decrease in the input signal thereto. This correspondingly changes the rate of change of the output signal until, with no input signal, there is no change in the output signal. Similarly, with the foregoing apparatus, if the input signal is totally removed for a time, the balancing motor is deenergized and holds its then-attained position. This, of course, maintains the position of the slider on the auxiliary slidewire, maintaining the output signal at whatever signal level had been attained at the time of the removal of the input signal.

It is a further object of the present invention to provide a completely electronic apparatus for producing an output signal which corresponds to that of the electromechanical servo system but without the mechanical movements.

It is still further object of the present invention to provide an improved control apparatus as set forth which is capable of being switched between a first and second source of input signal which signals being of differing characteristics.

In accomplishing these and other objects there has been provided, in accordance with the present invention, an all electronic circuit which includes a direct current amplifier. The direct current amplifier features a freedom from the drift conditions frequently associated with direct current amplifiers. It also features an extremely high input impedance. An integrating feedback network, together with an input signal limiting means, provides a desired output characteristic. Means are provided for selectively removing from the input of the amplifier all sources of signal other than the feedback capacitor of the integrating network. The capacitor is arranged to hold the output of the amplifier at whatever value was attained at the time that other sources of input signal were removed.

A better understanding of this invention may be had from the following detailed description when read in connection with the accompanying drawing in which:

The single figure is a schematic circuit diagram of apparatus embodying the present invention.

Referring now to the drawing in more detail, there is shown an amplifier 2 which is characterized in that it is, first, a direct current amplifier, second, that it is extremely stable with respect to drift or the like and, third that it presents an extremely high input impedance, say on the order of one hundred megohms. Although any amplifier exhibiting these characteristics is suitable for use in this circuit, one amplifier which is particularly suited to this use is shown and described in applicant's copending application Serial No. 836,716, filed August 28, 1959.

The amplifier 2 has a pair of input leads 4 and 6, one of which is grounded. The other lead 4 is connected to a feedback capacitor 8 which is, in turn, connected to the output 10 of the amplifier 2. There is provided a pair of system input terminals 12 and 14. For the purposes of this description, let it be assumed that the terminal 12 is arranged for connection to the output of an automatic control apparatus such, for example, as a sampling computer, while the terminal 14 is arranged for connection to a manual control member. One or the other of these two input terminals is connected to the input circuit of the amplifier 2 through the selective operation of a first input selector switch 16, through an isolating switch 18, an input resistor 20, an adjustable summing resistor 22 having a tap 24. The tap 24 of the summing resistor is connected to the movable blade of a second input selector switch 26. The second input selector switch 26 is ganged for conjoint operation with the first selector switch 16, as will be more fully set forth hereinafter. One contact of the switch 26 is connected to a first adjustable integrating resistor 28 while the other contact of the switch 26 is connected to a second adjustable integrating resistor 30.

The remote ends of the two integrating resistors are connected together and to one contact of an emergency switch 32. The blade position of the switch 32 is connected to the blade portion of a hold switch 34. One contact of the hold switch 34 is connected to ground and the other contact thereof is connected to the input terminal 4 of the amplifier 2. The input terminal 4 of the amplifier 2 thus constitutes a summing point between the signal from the input circuit and that of the feedback capacitor 8.

To the output 10 of the amplifier 2, there is connected a feedback resistor 36, the other end of which is connected to the end of the summing resistor 22 remote from that end thereof connected to the input resistor 20. Also connected to the tap 24 of the resistor 22 is a pair of signal limiting diodes 38 connected in shunt with the input of the amplifier 2.

As noted, the input circuit includes an emergency switch 32 one contact of which was described as being connected to the integrating resistors. The other contact of this switch 32 is connected to an emergency bias circuit. This circuit includes a further integrating resistor 40, connected to the slider 42 of a slidewire resistor 44. The slidewire resistor is connected at one end, through a resistor 48 to a bias polarity selector switch 50. To this switch 50 is connected an emergency bias signal source shown as a pair of batteries 52.

In operation, let it be assumed that the input selector switches are set to apply an input signal from the output of the computer, that the hold switches 18 and 34 are closed in their position to provide a continuous path for the input circuit, and that the emergency switch 32 is closed to connect the input to the amplifier 2 to the lower end of the integrating resistor 28. It will be noted that the general configuration of the amplifier circuit is that which has become known in the art as an operational amplifier. Thus, with a very high open loop gain in the amplifier, the net gain of the circuit is determined by the ratio of the feedback impedance to the input impedance. It is also characteristic of operational amplifiers of this type that the tendency is for the feedback signal to neutralize the input signal such that the net signal appearing at the input terminal 4 of the amplifier is substantially zero. Under ordinary circumstances of operation, if a large signal were applied to the system input terminal 12, thence through the input circuit to the input terminal 4 of the amplifier 2, the net output signal of the system would rise at a rate determined by the time constant of the feedback circuit. This is determined, largely, by the value of the feedback capacitor 8 and the integrating resistors 28 or 30, depending upon which is in the circuit. This would, of course, produce a signal which changes at an exponential rate and would not follow the desired characteristic curve set forth in the objects of this case. However, when it is seen that the input signal applied to the amplifier is limited by the diodes 38, the response characteristic is appreciably changed. If for example, the full input signal were, say, 10 volts and a maximum developed output signal of the system were similarly 10 volts the diodes 38 may be arranged to limit the input signal applied to the amplifier to, say, ½ of a volt. Under these conditions, the full effect of the feedback circuit cannot be felt at the input of the amplifier. That is, the change in the output signal due to the applied input signal cannot produce a corresponding change in the input signal applied to the amplifier so long as the difference between the input signal and the output signal exceeds the ½ volt limit established by the diodes. Thus, since the capacitor 8 and one or the other of the resistors 28 or 30 constitutes a signal integrator with the amplifier 2, the limiting of the input signals by the diodes results in a constant signal being applied to the input of the amplifier 2 the output of which must increase at a constant rate as determined by the integration rate. When the output signal approaches the value such that the potential at the tap 24 of the summing resistor is reduced to the ½ volt limit established by the diodes 38, the diodes cease to exert control over the input to the amplifier 2. At this point, a further increase in the output of the amplifier reduces the signal applied to the input of the amplifier, thereby reducing the rate of increase of the amplifier output signal. This relationship continues at an exponential rate until the input to the amplifier has been reduced to substantially zero and the output thereof ceases to change. The result of the foregoing relationship results in an output signal curve which substantially exactly matches that of the electromechanical servo systems.

In the present system, the slope of the straight line portion of the output curve may be adjusted. It will be recalled that the feedback capacitor 8 and either of the resistors 28 or 30 constitute an integrator. If the value of either the resistance or the capacitance is changed, the integration rate will be changed. In the instant case, the resistors 28 and 30 are illustrated as being variable for this purpose.

One of the other desirable attributes of the electromechanical servo system, as pointed out, is that if the input to the system were to be interrupted for any reason, the removal of the signal from the balancing motor stops the motor, leaving the output slider in its then attained position. This results in the output of the servo remaining constant at the attained value whenever and for as long as the input signal is removed from the system. Since this is a condition that prevails if the input to the system is taken from the output of a sampling computer, it is a desirable attribute.

This feature is also presented in the present apparatus. If the hold switch 34 is switched so that the blade engages the upper contact, the entire input circuit is removed from the input of the amplifier 2. This leaves only the capacitor 8 connected to the amplifier input. Since the capacitor is directly connected to the output circuit, it will be charged to a value representative of the output signal. Since the amplifier input presents an extremely high impedance to ground, there will be substantially no leakage of the capacitor charge. Therefore, the amplifier will continue to put out a signal which is at that value attained thereby at the time the hold swich 34 was switched. With a high quality capacitor and the extremely high input impedance of the amplifier, the output will hold flat for any desired length of time considered reasonable in the art. Under ordinary circumstances, it might be considered adequate to merely open the switch 34 from engagement with its lower contact. However, with a high gain amplifier, the sensitivity is sufficiently high to be responsive to leakage signals which may appear across the merely open contacts of a switch. Accordingly, to obviate this probable source of error during "hold" condition, the second contact of the hold switch 34 is connected to ground. Thus, when the switch 34 is transferred from the "operate" to the "hold" position, the entire input circuit is grounded.

It will be recalled that the input terminal 12 was to be connected to the output of a scanning computer. If, for example, the computer is used in sampling the conditions and effecting the required computational output for, say, ten stations, the output thereof would be connected to one particular output station for only one-tenth of the time. During the remainder of the time, the output of the computer would be connected to one or another of ten corresponding output stations. The actuation of the hold switch 34 of each of the ten output stations might well be effected by the commutating output selector of such a computer, thus assuring proper synchronization. Since, during the "hold" condition the input circuit is grounded, the output of the computer would "see" a relatively low impedance. In order to prevent this low impedance from being reflected back into the computer output circuit, thereby adversely affecting the accuracy of the control signal to the other stations, an isolating switch 18 is introduced. This switch 18 is arranged for simultaneous operation with the hold switch 34, and effectively introduces an infinite impedance between the output of the computer and the grounded input circuit of the present apparatus. This is accomplished by opening the circuit by the switch 18, as illustrated.

As noted, when the input selector switch 16 and 26 are closed to connect the present apparatus to the output of the computer, a control signal is applied only a portion of the time. During the time when no signal is applied, the amplifier is clamped at its attained level of output by the action of the capacitor 8. Thus, for an applied signal of predetermined value, the output signal will result in a curve which follows the straight-line integration in interrupted steps with intervening "hold" periods during which there is no change in the amplifier output. This has the effect of flattening the slope of the output curve by a factor of ten, assuming there are ten stations being scanned. There are occasions when it becomes desirable or necessary to control a particular station manually. To accommodate this condition, the input selector switches 16 and 26 may be moved to their right hand positions (as illustrated) to connect the input terminal 14 and the integrating resistor 30 into the circuit. As noted, the input terminal may be connected to a manually adjustable signal source. Since the manually adjustable signal would be of the same order of magnitude as the signal from the computer, and would be constant instead of commutated as in the case of the computer signal, other things being equal, the resultant slope of the output curve would be much greater than that obtained when the computer is in the input circuit. Since the slope of that curve is determined by the rate of integration of the signal, a change in the integrator parameters can be made which will bring the two curves into at least an approximate match. To accomplish this end, the second selector switch 26 effects a switch from the resistor 28 to the resistor 30 as an element of the integrating circuit. With this arrangement, the input to the amplifier may be switched between the computer output and the manual control without an appreciable deviation of the characteristic output curve and without disturbing the settling of the integrating resistors associated with each of separate input means.

In a number of instances of automatic control, there will be occasions when the controlled system is very far off schedule or the error is considerably larger than the controller can reasonably correct. In such instances it has been found desirable to have a means for by-passing the control action and to apply a large correction signal to the system to overcome the error. In systems where a single station would be involved, this would not be a serious problem. In other systems where the multiplicity of stations is included in an integrated, interdependent unit this could be a considerable problem. An example of the latter class of installation is seen in an electric power generating system involving a plurality of generating stations. If the system load or demand is widely different from that indicated by the controllers, it is desirable to be able to apply the large correction signal to all of the generating stations until the error is substantially reduced. This situation is met in the present apparatus by the inclusion of the emergency bias source 52 and the emergency switch 32. Inasmuch as the system error may be either in the positive direction or the negative direction, either a positive or negative bias signal is available in order that the output of the amplifier may be in the proper direction to overcome the error. The switch 50 is actuated to select the proper polarity. The selected bias signal is applied, through the slidewire 44 and the resistor 40 to the right hand contact of the switch 32, thence to the input of the amplifier. The integrating resistor 40, here, allows the amplifier output to increase at a rate which is substantially higher than the otherwise normal increase. However, the rate of increase is limited to such a value as will maintain a proper balance in the operation of the several components constituting the generating station.

From the foregoing, it may be seen that there has been provided an improved electrical control apparatus, the output of which conforms to that of electro-mechanical servo systems but without incorporating mechanically movable elements.

What is claimed is:

1. Electrical control apparatus comprising a direct current amplifier having a high input impedance, said amplifier having an input terminal and an output terminal, a capacitor directly connected between said input terminal and said output terminal, an apparatus input terminal, an input circuit including an input resistor and a feedback resistor serially connected between said apparatus input terminal and said amplifier output terminal, said input circuit further including an integrating resistor connected between the junction of said input resistor and said feedback resistor and said amplifier input terminal, said integrating resistor and said capacitor being cooperatively associated with said amplifier to provide an integrated output signal, and means for disconnecting said input circuit from said amplifier input terminal leaving only said capacitor connected to provide an input signal for said amplifier whereby to hold the output of said amplifier at the value attained at the time of the disconnection of said input circuit.

2. Electrical control apparatus comprising a direct current amplifier having a high input impedance, said amplifier having an input terminal and an output terminal, a capacitor directly connected between said input terminal and said output terminal, an apparatus input terminal, an input circuit including an input resistor and a feedback resistor serially connected between said apparatus input terminal and said amplifier output terminal, said input circuit further including an integrating resistor connected between said amplifier input terminal and the junction between said input resistor and said feedback resistor, said integrating resistor and said capacitor being cooperatively associated with said amplifier to provide an integrated output signal, signal limiting means connected between said junction and a point of fixed reference potential to limit the input signal to said amplifier, and means for disconnecting said input circuit from said amplifier input terminal leaving only said capacitor connected to provide an input signal for said amplifier whereby to hold the output of said amplifier at the value attained at the disconnection of said input circuit.

3. The invention as set forth in claim 2 wherein said means for disconnecting said input circuit from said amplifier input terminal comprises a periodically actuated switch.

4. The invention as set forth in claim 3 wherein said periodically actuated switch includes means for grounding said input circuit when said switch is actuated to disconnect said input circuit from said amplifier.

5. The invention as set forth in claim 2 characterized by the addition of means for applying an emergency bias signal to said input terminal of said amplifier.

6. The invention as set forth in claim 5 wherein said last mentioned means includes a source of bias signals and bias signal polarity selecting means for selectively biasing said amplifier in the required direction to effect the necessary control.

7. The invention as set forth in claim 2 wherein said signal limiting means comprises a pair of diodes.

References Cited in the file of this patent

UNITED STATES PATENTS

| | | |
|---|---|---|
| 2,741,668 | Iffland | Apr. 10, 1956 |
| 2,752,432 | Richter | June 26, 1956 |